United States Patent
Perelle

(10) Patent No.: US 6,750,631 B2
(45) Date of Patent: Jun. 15, 2004

(54) METHOD OF BALANCING AN ELECTRICAL BATTERY SUBJECTED TO DISCONTINUOUS CHARGING, AND A BATTERY MANAGEMENT SYSTEM FOR IMPLEMENTING THE METHOD

(75) Inventor: Michel Perelle, Parcay-Meslay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/157,130

(22) Filed: May 30, 2002

(65) Prior Publication Data

US 2002/0195994 A1 Dec. 26, 2002

(30) Foreign Application Priority Data

Jun. 7, 2001 (FR) ............................................. 01 07464

(51) Int. Cl.[7] .................................................. H02J 7/00
(52) U.S. Cl. ........................ 320/116; 320/112; 320/124
(58) Field of Search ................................ 320/116, 112, 320/124, 162, 122, 137; 429/90; 324/434

(56) References Cited

U.S. PATENT DOCUMENTS

| | | | |
|---|---|---|---|
| 3,493,837 A | | 2/1970 | Layte et al. ................. 320/102 |
| 4,238,721 A | * | 12/1980 | DeLuca et al. .............. 320/122 |
| 4,614,905 A | | 9/1986 | Petersson et al. ........... 320/122 |
| 5,233,285 A | * | 8/1993 | Pierret et al. .................. 320/28 |
| 5,773,957 A | * | 6/1998 | Imaseki ....................... 320/116 |

FOREIGN PATENT DOCUMENTS

FR 2 796 503 A 1/2001

* cited by examiner

Primary Examiner—Lawrence Luk
(74) Attorney, Agent, or Firm—Sughrue Mion, PLLC

(57) ABSTRACT

An electrical battery comprises a plurality of cells connected in series which are charged by a charger under the control of a battery management system including an individual current shunt circuit in parallel with each cell. The shunt circuit is activated if the voltage at the terminals of the cell exceeds a minimum balancing threshold value. A higher balancing threshold voltage is substituted for the minimum balancing threshold voltage if the battery has not been supplied with power by the charger for a time exceeding a particular time-delay. In the battery management system a single-wire control daisychain connects individual interfaces assigned to each cell of the battery in series to a common control interface.

8 Claims, 2 Drawing Sheets

METHOD OF BALANCING AN ELECTRICAL BATTERY SUBJECTED TO DISCONTINUOUS CHARGING, AND A BATTERY MANAGEMENT SYSTEM FOR IMPLEMENTING THE METHOD

CROSS-REFERENCE TO RELATED APPLICATIONS

This application is based on French Patent Application No. 01 07 464 filed Jun. 7, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of balancing a modular electrical storage battery comprising rechargeable cells connected in series. It also relates to a battery management system adapted to be incorporated into a battery charging and balancing facility to enable use of the method.

The method according to the invention is more particularly intended for use in applications where a battery is liable to be subjected to discontinuous charging, for example because the charger does not operate continuously or because the battery is not always electrically connected to a charger.

2. Description of the Prior Art

The method and the battery management system are in particular intended to be used with batteries which comprise a relatively large number of cells, because of the quantity of energy to be stored. As is well known to the person skilled in the art, the cells of the same battery, which are usually identical, can have different characteristics and consequently slightly different performance. The difference in performance between cells of the same battery can significantly increase over time and in the course of successive charging and discharging. This can degrade the cells of a battery and lead to imperfect operation of the load that the battery supplies with power.

The same charging or discharging current generally flows through the series-connected cells of a battery. However, balancing a battery sometimes requires different currents to flow through its various cells. Balancing a battery by discharging one cell by means of an individual shunt connected in parallel with it if the cell in question is overcharged is known to the person skilled in the art. The shunt includes a resistor for dissipating energy, for example. A shunt or bypass current then flows through the shunt and reduces the current flowing in the cell, or even shunts all of the current. The balancing capacity Q for a cell is proportional to the shunt current I and to the time for which the shunt is applied. It is therefore possible to obtain the same cell balancing effect with a high shunt current that flows for a relatively short time or a low shunt current that flows for a relatively long time. Historically, the first solution to be adopted was that using a high shunt current, as this enables balancing to be achieves in a short time, which is important if the time available for balancing is short. Allowing a shunt current to flow at one battery cell only from the time at which a particular activation threshold voltage is reached at the terminals of that cell is known to the person skilled in the art. The time necessary for this threshold voltage to be reached is subtracted from the time available for balancing the battery. The shorter the time available for balancing, the higher the shunt currents for the most highly charged battery cells.

One method known to the person skilled in the art uses a battery supervised by centralized logic for controlling the shunts as a function of voltages measured at the terminals of the individual cells with which the shunts are associated. The voltages present at the terminals of the battery cells are collated centrally to determine the highest voltage. The centralized logic activates the shunt assigned to the cell with this highest voltage at its terminals. This method performs balancing with low shunt currents, and the balancing time can be long. On the other hand, it has the drawback of necessitating relatively complex centralization, and this implies considerable software development. This is only a minor inconvenience in the case of high-voltage batteries, but there are many applications with only a few cells per battery where this kind of solution is not desirable, in particular for reasons of cost, which can be considered to be practically constant regardless of the number of cells.

Using the battery as a buffer between a charger and a load is also known to the person skilled in the art, in applications where a load is supplied with power continuously, as is conventionally the case in the field of telecommunications, in which case the battery is kept charged at a constant voltage, provided that the charger is supplied with power. In this case it is possible to carry out balancing cell by cell and starting smoothly from a particular threshold voltage per cell, which voltage increases as the measured voltage for each cell increases. A high shunt current represents the end of charging of the battery cell concerned, and is detected in order to instruct the charger to reduce the regulation voltage that it is supplying to the battery. The charges in the battery cells tend to balance out, since the shunt currents are a function of the respective voltages measured at the terminals of the various cells. In some applications, and in telecommunications applications in particular, the charger is supplied with power most of the time, so that balancing can be carried out over time with low shunt currents, and, because the battery is on virtually permanent charge, it is not discharged by any shunt currents that may be established at its cells. However, the method is not particularly suitable if quasi-continuous charging of a battery by a charger cannot be systematically achieved. In this case, the same drawbacks are encountered as for the first prior art solution, which relate to the fact that the time available for balancing can be short, the shunt currents must then be high, and the battery is partially discharged during the balancing phase.

SUMMARY OF THE INVENTION

The invention therefore proposes a method of balancing electrical batteries comprising a plurality of cells connected in series and which are charged by means of a charger under the control of a battery management system which associates an individual current shunt circuit in parallel with each cell and is activated if the voltage at the terminals of the cell exceeds a minimum balancing threshold value common to all the cells.

According to one feature of the invention, the method reduces the discharging of the battery cells during balancing when the battery is no longer supplied with power by a charger.

According to one feature of the invention, a higher balancing threshold voltage is substituted for the minimum balancing threshold voltage from the time at which the battery has not been supplied with power by the charger for a time greater than a particular time-delay. This prevents inappropriate discharging of the battery when it is not on charge whilst allowing balancing of the most highly charged cells.

The method according to the invention applies more particularly in the context of a battery management system which includes a control daisychain for continuously supplying a binary signal consisting of a current flowing between the end terminals of the battery through a series of transmission control gates each of which is assigned to a respective cell. Each gate is controlled so that it interrupts the flow of current in the control daisychain if the voltage at the terminals of the cell to which it is assigned exceeds a maximum voltage threshold value, any interruption of the current causing a switching control signal to be sent to the charger via a common control interface.

In the method according to the invention, a higher balancing threshold voltage is substituted for the minimum balancing threshold voltage in response to the interruption of the current flowing in the control daisychain and after a time exceeding a particular time-delay. This is a particularly economical way to implement the method according to the invention.

In one particular embodiment of the invention, the time for which the current flows in the control daisychain is measured to control incrementing of the voltage supplied to the battery by the charger by predetermined steps, and likewise the time that has elapsed since the interruption of the current is measured to control decrementing the voltage supplied to the battery by the charger by predetermined steps.

The invention also proposes a battery management system for a facility for charging and balancing a battery comprising rechargeable cells connected in series and adapted to be supplied with power by a charger adapted to supply at least one constant regulation voltage for charging the battery.

The battery management system includes:
an individual interface for each battery cell, the interface including:
   a first voltage measuring circuit connected to the terminals of the cell to command a current shunt connected in parallel with it to shunt at least a portion of the charging current that is supplied to it if the voltage measured at the terminals of the cell rises above a balancing minimum threshold value;
   a second voltage measuring circuit for determining if a maximum threshold value is exceeded at the terminals of the cell from a voltage measured across a measuring resistor in series with the shunt of the interface between the terminals of the cell; and
   a transmission control AND gate combining a binary signal received by the interface at an input terminal and a binary signal produced by the second measuring circuit of the interface to produce a resultant binary signal at an output terminal of the interface and corresponding to a current if the received signal is a current and the voltage measured by the second measuring circuit is less than the maximum threshold value; and
a common interface at the output of a control daisychain and connected to one end terminal of the battery via series-connected transmission gates of the individual interfaces to operate on the charger in the event of interruption of the resulting current sent via the transmission control gates of the individual interfaces if at least one voltage measured at the terminals of the cells of the battery exceeds the maximum threshold value and the control daisychain is interrupted for this reason or any other reason.

The facility includes a switching unit, between an end terminal of the battery and an input terminal of the individual interface situated at the head of the control daisychain and assigned to the cell connected to the end terminal, for interrupting the resulting current that flows through the control daisychain, and a first measuring circuit in each individual interface which includes means for substituting a balancing threshold value higher than the minimum balancing threshold value if the current flowing between the battery terminals via the control daisychain is interrupted.

According to the invention, the battery management system also includes time-delay means associated with the switching member to delay the interruption of the current flowing through the control daisychain for a predetermined time after the charger stops supplying charge to the battery.

According to the invention, the common control interface includes and controls a counter for commanding stepwise switching of the voltage supplied by the charger to the battery, which voltage is incremented in steps if the common interface receives the current flowing in the control daisychain, and decremented in steps, preferably at a faster rate, if the current flowing in the control daisychain is interrupted.

The invention, its features and its advantages are explained in the following description, with reference to the accompanying drawings.

DETAILED DESCRIPTION OF THE PREFERRED EMBODIMENT

Figure 1:
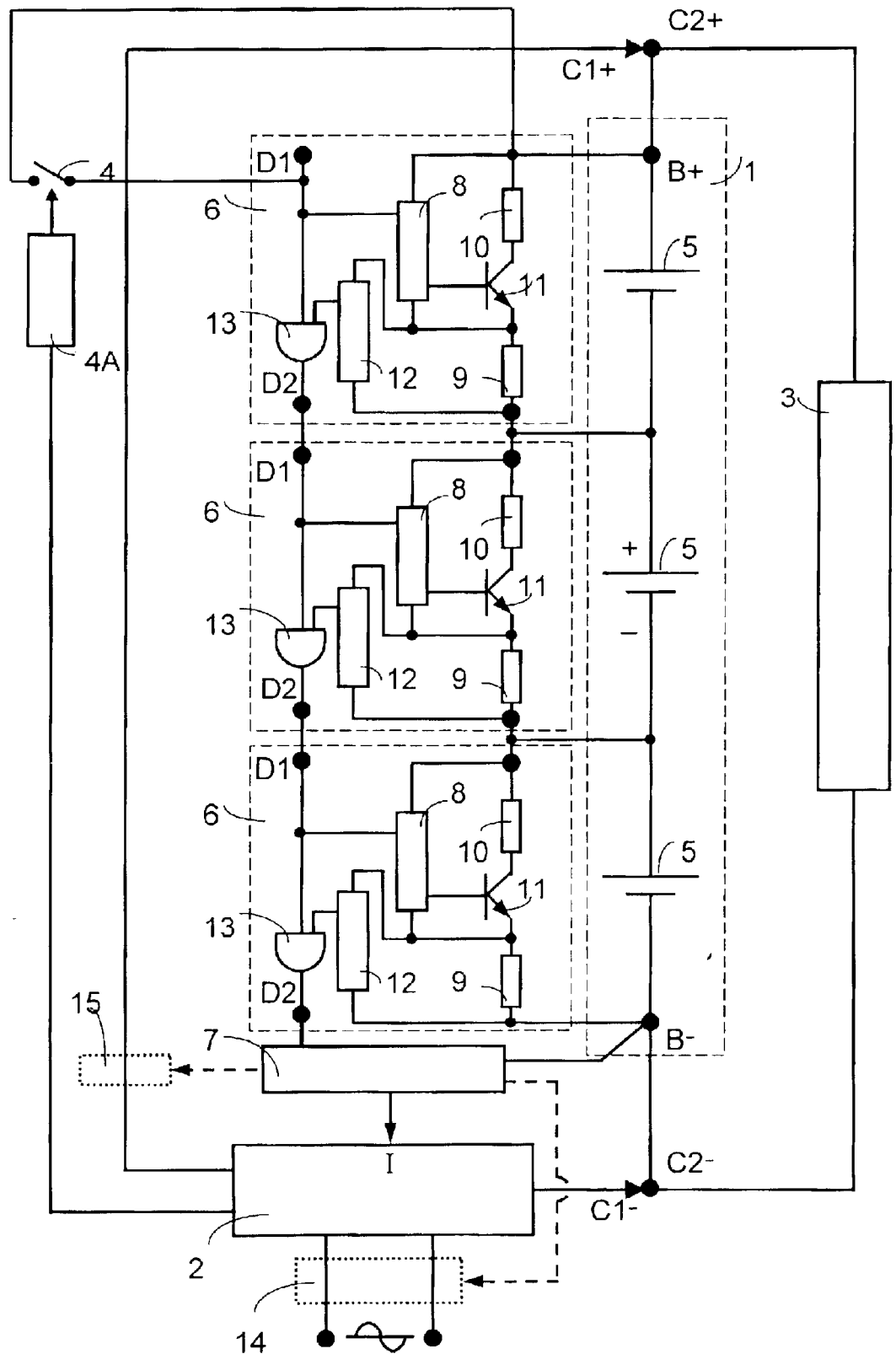
FIG. 1 is a schematic of a facility including a charger and a battery management system for charging and balancing a battery using the balancing method according to the invention.

The FIG. 1 schematic shows a facility for charging and balancing an electrical battery 1 with which are associated a charger 2 for charging the battery from a supply, not shown, and a load 3 which can be supplied with power by the battery.

For example, the battery is installed on an automobile vehicle incorporating electrical equipment and possibly a propulsion electric motor. The modular battery comprises a set of modules connected in series. Each module comprises at least one rechargeable cell 5. To simplify the explanation, the remainder of the application refers to only one rechargeable cell per module, on the understanding that the invention can be implemented with modules comprising a plurality of cells.

The battery 1 shown has two end terminals B+ and B− between which three rechargeable cells 5 are connected in series. The cells are lithium-ion cells, for example.

The charger 2 is supplied with electrical power by an electrical power distribution network or an independent electrical generator, for example. The generator can be mounted in a vehicle. In the type of application considered here, the battery is likely to be charged discontinuously, in the sense that there is a risk of charging being interrupted temporarily.

In the example proposed, the charger 2 is connected to the end terminals of a battery to be charged via connection members C1+ and C1−. The load 3 that the battery 1 can supply with power is connected to the battery via connection members C2+ and C2−. The connection members can be of a type known to the person skilled in the art and for this reason are not described in detail here.

If necessary, the battery 1 can be charged by the charger 2 while the load 3 is being supplied with power, in which case the charger and the power supply circuit are connected simultaneously to the end terminals of the battery.

A respective shunt is connected in parallel with each cell 5. This is known to the person skilled in the art. Each shunt bypasses at least part of the current supplied to the battery by the charger and flowing in a cell 5 if the voltage measured at the terminals of that cell rises above a particular minimum threshold value that activates balancing.

In the embodiment described, the shunt assigned to each cell 5 of a battery is incorporated in an individual interface 6 associated with that cell. The individual interfaces are connected in common to a common interface 7 of a battery management system by a control daisychain.

The shunt in each individual interface operates in accordance with the principle described in European patent 0 121 547, for example, as succinctly described hereinafter.

A voltage measuring circuit 8 is connected to the terminals of each cell 5 via a measuring resistor 9 connected to the negative terminal of the cell. The circuit 8 controls the switching into circuit of a shunt which comprises a resistor 10 and a transistor 11 and is connected in series with the measuring resistor 9 between the terminals of the cell 5 to which the shunt is assigned. In the embodiment described, no current flows in the shunt specific to a cell 5 if the voltage v measured by the measuring circuit 8 at the terminals of that cell does not reach a particular minimum threshold value V1 that activates balancing. The measuring circuit 8 controls the transistor 11 so that it shunts a portion of the current supplied by the charger to the cell 5 as soon as the measured voltage v exceeds the threshold value V1. The shunted current increases progressively as the image voltage v measured by the measuring circuit 8 increases, which voltage reflects a progressive increase in the voltage at the terminals of the cell 5 monitored by the measuring circuit.

The invention provides means for imposing one or the other of two balancing minimum threshold values V1 and V1' on each measuring circuit 8.

The threshold value V1 is taken into account when the battery is being supplied with power by the charger 2.

The value V1', which is higher than the value V1, is taken into account when the battery has not been supplied with power by the charger for a time exceeding a particular time-delay T. It is also taken into account by any cell 5 between the common interface 7 and another cell 5 which is on its upstream side relative to the interface and which has reached a particular maximum voltage threshold value V2 at the end of charging, which value V2 is the same for all the cells of the battery.

In the example proposed, a switching unit 4 whose operation is subject to a time-delay is provided for simultaneously switching from one activation threshold value to the other all of the measuring circuits 8 assigned to the cells 5 of a battery. The switching unit 4 is controlled as a function of the on or off state of the charger 2. If the charger 2 is on and supplying power to the battery, the switching unit 4 is switched to impose the lower balancing minimum threshold value V1. If the charger is turned off, the switching unit 4 is switched to impose the threshold value V1' after a time lapse equal to the time-delay T. In the example described, this is symbolized by a time-delay unit 4A between the charger 2 and the switching unit 4 which takes into account a characteristic binary signal produced in the charger and which operates on the control circuit of the switching unit. The time-delay unit 4A can be adjustable and can constitute an independent component; alternatively, it can be included in a control circuit, not shown, of the charger 2 or the switching unit 4.

As a general rule, each individual interface 6 includes a second voltage measuring circuit 12 adapted to supply to the common interface 7 a binary indication relating to the voltage at the terminals of the rechargeable cell 5 of the battery 1 that it is monitoring. This voltage corresponds to the sum of the voltage across the resistor 9 and whichever of the voltages V1 or V'1 is imposed at the time in question, from the time at which the imposed voltage is reached during the charging phase. The end of charging is then monitored by a voltage constituting an image of the current flowing in the resistor 9; a current flows through this resistor as soon as the imposed voltage has been reached at the terminals of the rechargeable cell that is being monitored.

Current flows in the resistor 9 only from the time at which the voltage at the terminals of the cell 5 is at least equal to the imposed voltage value V1 or V'1.

The indication relating to the voltage at the terminals of a cell supplied by an individual interface corresponds to a binary 0 signal when the voltage at the terminals of the cell 5 exceeds the maximum threshold value V2 and to a binary 1 signal if that threshold is not reached. The value V2 is chosen to be less than or at most equal to the maximum voltage Vm permitted at the terminals of one of the rechargeable cells that constitute the battery 1, the values V2 and Vm being fixed as a function of the nature of the cells 5 that constitute the battery. The indication supplied by a measuring circuit 12 is sent from the individual interface 6 that contains the circuit to the common interface 7 via a circuit which constitutes a transmission control gate 13 specific to that individual interface and which has an AND type logic function.

In a preferred embodiment of the invention, the battery management system includes a single-wire control daisychain that continuously provides a binary indication in the form of a binary signal consisting of a current flowing between the terminals of the battery and through the common interface and the transmission control gates 13 of the respective individual interfaces assigned to the battery cells. The gates 13 are connected in series and each of them interrupts the flow of current in the single-wire control daisychain when the voltage at the terminals of the cell to which it is assigned exceeds the maximum threshold value V2. The common interface monitors the presence of the current, detects interruptions in it, and operates on the charging process accordingly.

In the example described, the control daisychain is obtained by connecting in series the individual interfaces 6 which each have a daisychain input terminal D1 and a daisychain output terminal D2 between which the transmission gate 13 of the interface is connected.

Each transmission control gate 13 has a first input through which it receives an indication that the maximum threshold value supplied by the measuring circuit 12 of the individual interface that includes it has been exceeded and a second input, called the daisychain input. The daisychain input of a transmission control gate of an individual interface is connected to the output of the transmission control gate that precedes it in the control daisychain, and the daisychain input of the interface at the head of the daisychain is connected to the end terminal B+ of the battery via the switching unit 4.

The current constituting the signal sent through the control daisychain is normally received by each transmission control gate at its daisychain input unless it is interrupted upstream of the gate. Each gate interrupts the current when an indication that the maximum threshold value V2 has been exceeded is supplied to its first input by the measuring circuit 12 of the individual interface that includes it.

In the event of an explicit request to close the charger, the current flowing in the daisychain passes through the switching unit 4 while it is switched on, i.e. when the battery 1 is supplied with power by the charger 2, and during the time-delay T starting from switching off the charger. It is maintained if no interruption is created by a transmission control gate or by a break in the daisychain. The proposed solution also operates on the charger in the event of a break in the continuity of the daisychain, in the same manner as in the event of the maximum threshold value V2 being exceeded. In the context of the invention, a break in the daisychain can be created by switching the switching unit 4 from the on state to the off state, the break occurring a time T after the charger 2 is switched off.

The common interface 7 is connected to the charger 2, as symbolized by the connection that connects this interface to a control input I of the charger. It operates by sending a switching signal characteristic of a switching function incorporated into the charger 2, or possibly associated with it, symbolized by a circuit 14 inserted into the power supply circuit of the charger 2 or a circuit 15 in the charging circuit connecting the battery to the charger.

Charging cells of the battery using a charger which modifies the voltage applied to the battery to charge it in stepwise fashion is also envisaged. The common interface 7 then includes a counter enabling it to measure the time for which it receives a current corresponding to the binary 1 signal, via the control daisychain, from the time at which this current is received. The counter is adapted to operate at the level of the switching function of the charger or of the combination associating it with a circuit 14 or 15, in order to command a succession of voltage switching operations during a charging operation and reflected in the incrementing of the voltage supplied by the charger to the battery by predetermined steps, for as long as the common interface 7 receives the current corresponding to the binary 1 signal that flows in the control daisychain. A stepwise decrementing of the voltage supplied by the charger can be obtained from a measurement of the time during which no current is any longer supplied to the common interface 7 via the control daisychain because of an interruption in the daisychain and following any such interruption. In a preferred embodiment, the voltage is decremented quickly and incremented slowly.

As previously indicated, there is provision for using two different threshold values V1 and V1' to balance a battery optimally, allowing for the conditions to which the battery is subjected. If the battery is on charge, or has just been at least partly charged, the current is shunted at each battery cell from the time at which the voltage at the terminals of that cell is greater than the lower of the two balancing threshold values, here the value V1. If the battery has not been on charge for a time exceeding the time-delay T, current at each battery cell is shunted from the time at which the voltage at the terminals of that element is greater than the higher balancing threshold value V1', to ensure that balancing is applied only to the most highly charged battery cells and avoid counterproductive reduction of the charge of the other cells.

Figure 2:
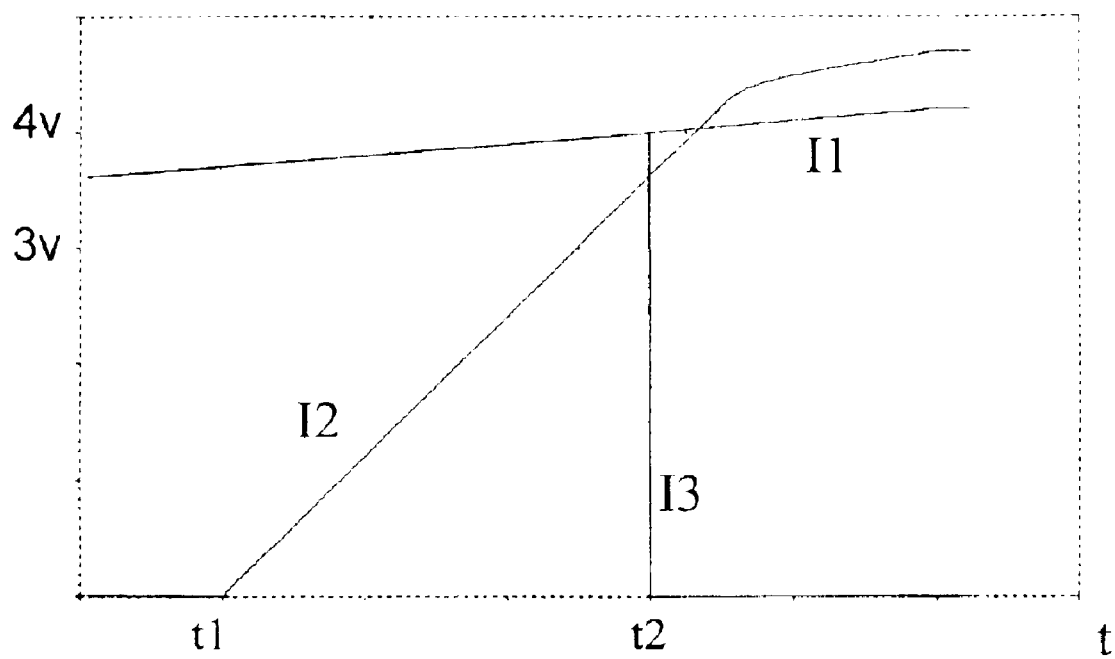
FIG. 2 is a diagram relating to the operation of an individual interface for a system in accordance with the invention for managing a battery charging and balancing facility.

In the case of lithium-ion cells, the voltage at the terminals of each cell 5 increases progressively during a charging phase as shown in FIG. 2, in which the curve 11 shows this voltage during the charging phase.

Balancing is initiated for a cell 5 when the voltage at the terminals of that cell reaches the threshold value V1, which here is equal to 3.7 volts, which occurs at time t1 in FIG. 2, and the balancing current begins to increase linearly, as shown by the balancing current variation curve I2. If the current flowing in the control daisychain is not interrupted by some other means, the charging of a cell continues until a time t2 at which the voltage at the terminals of that cell reaches the maximum threshold value V2 from which the individual interface of the cell interrupts the flow of current in the daisychain, as symbolized by the vertical line I3.

This interruption is exploited by the common interface 7, which operates accordingly and in a predetermined manner on the charger, as already mentioned.

If charging of the battery is interrupted for this reason or for any of the reasons referred to above and, as a consequence of this, no current is any longer supplied, balancing nevertheless continues, at least for the most highly charged cells of the battery. Balancing continues under the initial conditions for as long as the switching unit 4 continues to be switched on by the time-delay unit 4A, i.e. for as long as the voltage at the terminals of each cell is greater than the minimum threshold value V1. The energy consumption of each individual interface in the balancing phase can then be considered as practically corresponding to the balancing current flowing through it and which comes from the cell to which it is assigned.

If the lack of charging current continues for a time greater than the time-delay T, the control daisychain is interrupted at the switching unit 4 if no such interruption has already occurred for any of the other reasons mentioned above. As soon as the control daisychain is interrupted upstream of a cell individual interface, regardless of the cause of this, the threshold value V1' is substituted for the minimum threshold value V1 at that individual interface and each of the downstream individual interfaces, for the reasons indicated above.

One embodiment of the invention uses a time-delay T of the order of 4 hours and threshold values V1 and V1' respectively equal to 3.7 volts and 3.9 volts. When the balancing voltage imposed on each cell is equal to the value V1', balancing is therefore applied only to the cells of the battery that have a voltage at their terminals at least equal to 3.9 volts. This avoids inappropriate discharging of the battery, although it is not on charge and it may be as well to postpone more thorough balancing and therefore discharging of the least highly charged cells. Of course, modifying the time-delay as a function of requirements by various means known to the person skilled in the art and not expanded on here can be envisaged.

The battery management system according to the invention, as described hereinabove, has the advantage of allowing "floating" operation of the battery, if required, from the time at which charging of the battery by the charger is maintained and the charger is controlled by the common interface in such a way as to permit this. The balancing voltage can be maintained at the lower threshold value V1 by keeping the switching unit 4 switched on under the control of the charger and via the time-delay unit.

As an alternative to this, it is possible to apply off-load balancing to the cells of a battery that have a voltage at least equal to the lower threshold value V1 between their terminals, in which case the battery is partly discharged at the end of balancing.

What is claimed is:

1. A method of balancing an electrical battery comprising a plurality of cells connected in series and which is charged by a charger under the control of a battery management system incorporating an individual current shunt in parallel with each cell which is activated when the voltage at the terminals of said cell exceeds a minimum balancing threshold value common to all said cells, in which method discharging of said battery cells during balancing is reduced by substituting a higher balancing threshold voltage for said minimum balancing threshold voltage when said battery has not been supplied with power by said charger for a time greater than a particular time-delay.

2. The balancing method claimed in claim 1 wherein said battery management system includes a control daisychain for continuously supplying a binary signal consisting of a current flowing between said terminals of said battery via a series of transmission control gates each assigned to a respective cell and each commanded to interrupt the flow of current in said control daisychain if the voltage at said terminals of said cell to which it is assigned exceeds a maximum voltage threshold value, any interruption of said current is reflected in a switching control signal sent to said charger via a common control interface, and a higher balancing threshold voltage is substituted for said minimum balancing threshold voltage in response to interruption of the current flowing in said control daisychain for a time greater than a particular time-delay.

3. The balancing method claimed in claim 2 wherein the time for which said current flows in said control daisychain is measured to command incrementing of the voltage supplied to said battery by said charger by predetermined steps and the time elapsed after an interruption of said current is measured to command decrementing of the voltage supplied to said battery by said charger by predetermined steps.

4. A battery management system for a facility for charging and balancing a battery comprising rechargeable cells connected in series and adapted to be supplied with power by a charger adapted to provide at least one constant regulation voltage for charging said battery, wherein said battery is associated with:

an individual interface for each battery cell, said interface including:
  a first voltage measuring circuit connected to said terminals of said cell to command a current shunt connected in parallel with it to shunt at least a portion of the charging current that is supplied to it if the voltage measured at the terminals of said cell rises above a balancing minimum threshold value;
  a second voltage measuring circuit for determining if a maximum threshold value is exceeded at said terminals of said cell from a voltage measured across a measuring resistor in series with said shunt of said interface between the terminals of said cell; and
  a transmission control AND gate combining a binary signal received by said interface at an input terminal and a binary signal produced by said second measuring circuit of said interface to produce a resultant binary signal at an output terminal of said interface and corresponding to a current if said received signal is a current and said voltage measured by said second measuring circuit is less than said maximum threshold value; and a common interface at the output of a control daisychain and connected to one end terminal of said battery via series-connected transmission gates of said individual interfaces to operate on said charger in the event of interruption of the resulting current sent via said transmission control gates of said individual interfaces if at least one voltage measured at said terminals of said cells of said battery exceeds said maximum threshold value and said control daisychain is interrupted for this reason or any other reason; said facility including a switching unit, between an end terminal of said battery and an input terminal of said individual interface situated at the head of said control daisychain and assigned to said cell connected to said end terminal, for interrupting the resulting current that flows through said control daisychain, and a first measuring circuit in each individual interface which includes means for substituting a balancing threshold value higher than said minimum balancing threshold value if the current flowing between said battery terminals via said control daisychain is interrupted.

5. The battery management system claimed in claim 4 wherein time-delay means associated with said switching member delay the interruption of said current flowing through said control daisychain for a predetermined time after said charger stops supplying charge to said battery.

6. The battery management system claimed in claim 4 wherein said common control interface includes and controls a counter for commanding stepwise switching of the voltage supplied by said charger to said battery, which voltage is incremented in steps if said common interface receives the current flowing in said control daisychain, and decremented in steps, preferably at a faster rate, if the current flowing in said control daisychain is interrupted.

7. A battery management system for a facility for charging and balancing a battery comprising rechargeable cells connected in series and adapted to be supplied with power by a charger adapted to provide at least one constant regulation voltage for charging said battery, wherein said battery is associated with:

an individual interface for each battery cell, said interface including:
  means for shunting at least a portion of the charging current that is supplied to one of the rechargeable cells if the voltage measured at terminals of said one cell rises above a balancing minimum threshold value;
  means for measuring a voltage, and determining if a maximum threshold voltage is exceeded, at said terminals of said one cell; and
  means for combining a binary signal received by said interface at an input terminal and a binary signal produced by said means for measuring and determining to produce a resultant binary signal at an output terminal of said interface and corresponding to a current if said received signal is a current and said voltage measured by said means for measuring and determining is less than said maximum threshold value; and means for controlling said charger, said means for controlling being connected to the output of a control daisychain and connected to one end terminal of said battery via series-connected transmission gates of said individual interfaces, wherein said means for controlling controls said charger in the event of interruption of the resulting current sent via said transmission control gates of said individual interfaces if at least one voltage measured at said terminals of said cells of said battery exceeds said maximum threshold value and said control daisychain is interrupted for this reason or any other reason;

said facility including means for interrupting current that flows through said control daisy chain, said means for interrupting being connected between an end terminal of said battery and an input terminal of said individual interface situated at the head of said control daisychain and assigned to said cell connected to said end terminal, and means for substituting a balancing threshold value higher than said minimum balancing threshold value if the current flowing between said battery terminals via said control daisychain is interrupted.

8. A method of balancing an electrical battery, the method comprising:

a step of reducing discharge of at least one of a plurality of cells of the battery, such cells being connected in series and being charged by a charger under the control of a battery management system incorporating a plurality of individual current shunts, with each individual current shunt being in parallel with a cell;

a step of activating one of the plurality of individual current shunts when the voltage at a terminal of the cell exceeds a minimum balancing threshold value common to all of the cells;

wherein the step of reducing discharge includes substituting a higher balancing threshold voltage for the minimum balancing threshold voltage when the battery has not been supplied with power by the charger for a time greater than a particular time-delay, so as to prolong battery life.

* * * * *